US007776435B2

(12) United States Patent
Omote et al.

(10) Patent No.: US 7,776,435 B2
(45) Date of Patent: Aug. 17, 2010

(54) ELECTROPHOTOGRAPHIC TRANSFER PAPER

(75) Inventors: Hisahiro Omote, Tokyo (JP); Jiro Yoshimura, Tokyo (JP); Akio Hoshino, Kita-ku (JP); Masahito Suzuki, Kita-ku (JP); Tomoyuki Nakano, Kita-ku (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 12/064,161

(22) PCT Filed: Aug. 15, 2006

(86) PCT No.: PCT/JP2006/316053

§ 371 (c)(1),
(2), (4) Date: Feb. 19, 2008

(87) PCT Pub. No.: WO2007/020927

PCT Pub. Date: Feb. 22, 2007

(65) Prior Publication Data

US 2009/0136858 A1 May 28, 2009

(30) Foreign Application Priority Data

Aug. 17, 2005 (JP) .............................. 2005-236415

(51) Int. Cl.
*B32B 18/00* (2006.01)
(52) U.S. Cl. .................... 428/325; 428/340; 428/341; 428/342; 428/474.4; 428/511; 428/512; 428/514
(58) Field of Classification Search ................. 428/325, 428/340, 341, 342, 474.4, 511, 512, 514
See application file for complete search history.

(56) References Cited

U.S. PATENT DOCUMENTS 7,070,860 B2 * 7/2006 Kobayashi et al. .......... 428/412

2004/0001963 A1 * 1/2004 Watanabe et al. ........... 428/514
2004/0126690 A1 * 7/2004 Kobayashi et al. ............ 430/97

FOREIGN PATENT DOCUMENTS

| JP | 5-11487 A | 1/1993 |
|----|-----------|--------|
| JP | 2000-292961 A | 10/2000 |
| JP | 2000-345493 A | 12/2000 |
| JP | 2002-341582 A | 11/2002 |
| JP | 2004-3083 A | 1/2004 |
| JP | 2004-77667 A | 3/2004 |
| JP | 2004-101544 A | 4/2004 |
| JP | 2004-258338 A | 9/2004 |
| JP | 2005-25007 A | 1/2005 |
| JP | 2005-62710 A | 3/2005 |

OTHER PUBLICATIONS

Astra-Plus/Kaolin.*

* cited by examiner

*Primary Examiner*—Betelhem Shewareged
(74) *Attorney, Agent, or Firm*—Millen, White, Zelano & Branigan, P.C.

(57) ABSTRACT

The present invention is an electrophotographic transfer paper where at least one side of the base paper is given a coating layer with a pigment and an adhesive agent to form coated paper and where the aforementioned adhesive contains a branched poly(meth)acrylamide copolymer having a cationic groups and/or anionic groups and also has a weight average molecular weight of 50,000 to 1,000,000. The electrophotographic transfer paper in the present invention has superior high-speed throughput performance despite low basis weight and a low coating weight, therefore, good for high-speed copy machine and printer properties, especially, when it contained a printability improver in the coating layer, it has a good ink adhesion property and surface strength required in offset printing.

12 Claims, No Drawings

ELECTROPHOTOGRAPHIC TRANSFER PAPER

TECHNICAL FIELD

This invention relates to electrophotographic transfer paper which not only demonstrates satisfactory continuous paper throughput performance in high-speed, sheet-fed electrophotographic copy machine and printers, but also demonstrates superior color printing properties and is suitable as a paper for book leaves and the like. Further, it also relates to coated paper that is superior in terms of offset printability in addition to electrophotography.

BACKGROUND ART

Conventional paper for electrophotographic high-speed machines is comprised of accordion-fold continuous form paper, and continuous form paper which is fed into the printer via rollers. In recent years, however, electrophotographic colour copy machine and colour printers which use cut-sheet paper are now required to have a throughput speed of 60 to 100 pages per minute.

The main advantages to using cut-sheet paper (hereafter "sheet-fed paper") are that it is easy to change the paper type and size, and that there are no wasted offcuts when bookbinding since there is no need to cut the paper. Sheet-fed paper is suitable for "on-demand" small lot printing—which handles manuals, self-published and other materials in the order of a few thousand units or less—where it can comprehensively address customers' requests.

However, because of the disadvantages of copy machines and printers using sheet-fed paper, it is difficult to increase the printing speed in comparison to continuous form paper. In sheet-fed copy machines and printers, paper is passed along by running it between rollers or belts rather than by pinching the paper with claws as sheet-fed offset printers do. Because of this, paper with low stiffness has poor throughput performance. The paper is not easily transferred between rollers and jams easily, making continuous printing difficult.

Conventionally, woodfree paper has been used with high-speed, sheet-fed electrophotographic copy machines and printers as an adequate paper. However, as described previously, in order to meet wide and varied customer's demands arising from the spread of self-publishing and the like, there is a need to develop a coated paper with superior printability which will enable continuous printing on high-speed colour copy machines and colour printers. Further, when using the paper for book leaves, weight (basis weight) and thickness are important. Paper can reach a considerable weight if aggregated many times over. In particular, coated paper has a high basis weight. Since books with coated paper leaves become extremely heavy, there is a need for a light and thin coated paper. Generally, however, reducing the weight of the paper results in decrease of the paper thickness and reduces the stiffness, giving rise to a tendency for running performance failures such as a poor paper feed or jams. This is particularly the case for electrophotographic copy machines and printers.

In terms of pigment-coated electrophotographic paper, electrophotographic transfer papers which specify the center line average roughness, the surface electrical resistance or the static friction coefficient between paper sheets have already been disclosed (Patent Documents 1-3). This is after the base paper has been given a coating layer that includes a pigment with a specific particle size and a specific adhesive agent, and then has been subjected to smoothing. However, the image quality and throughput performance of this transfer paper has been far from adequate. Further, a method has been disclosed that enhances the printed image and throughput performance by specifying the basis weight, the surface roughness of the coating layer and the stiffness (Patent Document 4). However, not only any image quality but also high-speed running performance has been insufficient.

PATENT DOCUMENT 1: Unexamined Patent Application Publication

TokkaiSho62-198875

PATENT DOCUMENT 2: Unexamined Patent Application Publication

TokkaiSho62-198876

PATENT DOCUMENT 3: Unexamined Patent Application Publication

TokkaiSho62-198877

PATENT DOCUMENT 4: Unexamined Patent Application Publication

Tokkai2000-172001

Generally, it is often the case that a coating layer of 5.0 $g/m^2$ or more is created on one side of the base paper, after which the coated paper is manufactured by smoothing the surface via calendaring. The paper's stiffness is reduced as a result of being put under pressure during the calendaring process. Given this, one way of improving coated paper stiffness has been to improve the base paper.

For instance, the inclusion of paper strength additives such as polyacrylamide or starch improves paper stiffness. However, increasing the proportion of the additives than usual, the formation of the paper apt to deteriorate and, rather tends to reduce stiffness. Further, not only does the addition of large quantities of these cohesive and adhesive chemicals during the paper making process have tendency of the process defects but also increase of costs.

On the other hand, branched polyacrylamide having a relatively high molecular weight (approximately 2,500,000 to 4,000,000) is used as a paper strength improver additive. By using it as a surface coating agent, the stiffness is remarkably improved, since the large effect of binding pulp fibers existing in a paper surface together results in a suppression of its penetration into the paper. The branched polyacrylamide as an additive is manufactured from an acrylamide monomer, a cationic monomer such as quaternary and/or tertiary ammonium, and/or an anionic monomer containing a carboxyl group, and a cross-linking agent. However, it has high viscosity and shows a high spinnability. This leads to process and quality the problems including boiling during the coating process and the occurrence of a mist between the coating rollers which give rise to non-uniform coating.

Further, a method has been disclosed (Patent Document 5) for increasing paper stiffness by first coating the base paper with an acrylic resin that contains polyacrylamide using a size press and then preparing a coating layer that includes a pigment and an adhesive agent. However, the acrylic resin that is generally used as a paper surface coating agent has been unable to improve the stiffness sufficiently since it is a polymer with a relatively low molecular weight (approximately a several 100,000). When the molecular weight is increased the stiffness is improved, however, the coating to the base paper is hardly carried out since the viscosity of the coating fluid becomes extremely high.

As described above, obtaining a coated electrophotographic transfer paper having a coating layer containing a pigment and an adhesive agent, which has superior running performance, was difficult with conventional technology.

PATENT DOCUMENT 5: Unexamined Patent Application Publication

Tokkai2004-068242

Further, high-speed sheet-fed electrophotographic copy machines and printers are used in the printing of small lots less than several thousand units. Therefore, demand for electrophotographic transfer paper has increased, however, it still only occupies a very small amount of the paper stock used in printing.

In addition, on-demand printing does not always use high-speed, sheet-fed electrophotographic copy machines and printers. As with invoices, receipts and similar documents, sometimes the predetermined parts are printed in advance via offset printing while just the section with variable information is later added via on-demand printing. Further, the majority of printing houses that carry out on-demand printing also perform offset printing. Instead of paper specialized to on-demand printing, if they had multipurpose paper which could also be used for offset printing, then they could reduce the burden associated with managing paper stock and could reduce the amount of stock held. From this viewpoint, there is a need for electrophotographic transfer paper which also has superior offset printability.

However, the properties of electrophotographic transfer paper are inferior to ink adhesion property and surface strength which are required for offset printing paper. It has been difficult, therefore, to develop a coated paper which is: superior in terms of high-speed, sheet-fed electrophotographic high-speed throughput performance and printing property; has good printability in terms of ink adhesion property and surface strength which are necessary for offset printing; and which is superior in terms of both electrophotographic and offset printability, having satisfactory coating performance and productivity.

DISCLOSURE OF THE INVENTION

Problems to be Solved by the Invention

Consequently, the first object of the present invention is to provide an electrophotographic transfer paper that is suitable for high-speed copy machines and printers and, in particular, has superior electrophotographic properties, which has a low basis weight, good full colour printability and good throughput performance.

The second object of the present invention is to provide an electrophotographic transfer paper that is not only superior in terms electrophotographic properties as described above, but which also has ink adhesion property and surface strength as required in offset printing.

Means for Solving the Problems

After keenly reviewing how to achieve the objectives described above, the present inventors arrived at the present invention by discovering that the inclusion in a coating adhesive agent of a branched poly(meth)acrylamide copolymer which contains cationic and/or anionic groups of specific molecular weights is extremely effective.

Namely, the present invention is an electrophotographic transfer paper where at least one side of the base paper is given a coating layer with a pigment and an adhesive agent to form coated paper and where the aforementioned adhesive agent contains branched poly(meth)acrylamide copolymer which has a cationic groups and/or anionic groups and also has a weight average molecular weight of 50,000 to 1,000,000.

For the branched poly(meth)acrylamide copolymer described above, it is preferable for the weight average molecular weight to be between 50,000 and 300,000. It is also preferable for there to be 1.0 to 10.0 parts by weight of the branched poly(meth)acrylamide copolymer with respect to 100 parts by weight of pigment.

Further, it is preferable that the branched poly(meth)acrylamide copolymer described above is obtained from the copolymerization of: at least one (meth) acrylamide monomer; at least one monomer selected from a group consisting of monomers with a cationic group and/or an anionic group together with polymerizable double-bonds and quaternary ammonium salt monomers which contain polymerizable double-bonds; and a cross-linking agent.

Further, it is preferable for the aforementioned branched poly(meth)acrylamide copolymer to account for 5 to 50 percent of the weight of the adhesive described above.

Further, it is preferable for the aforementioned adhesive to have 5 to 9 parts by weight of styrene-butadiene copolymer latex as dry solid content to 100 parts by weight of pigment and/or 3 to 7 parts by weight of starch to 100 parts by weight of pigment.

In the present invention, from the viewpoint of providing satisfactory offset printability by improving ink adhesion property and minimizing piling, it is preferable that, of the 100 parts by weight of pigment, at least 50 parts by weight are kaolin which has at least 65% of the particle size distribution in a range from 0.4 to 4.2 µm by volume. Further, it is preferable that, in the coating layer comprising the aforementioned pigment and adhesive agent, there is between 0.1 to 1.0 parts by weight of printability improver to 100 parts by weight of pigment. Further, it is preferable for the Clark stiffness in the CD direction of the electrophotographic transfer paper in the present invention to be at least 30 $cm^3/100$.

The electrophotographic transfer paper in the present invention retains the aforementioned electrophotographic properties even with a low basis weight of 40 to 100 $kg/m^2$. Further, the concept "(meth)acryl" in the present invention includes both "acryl" and "methacryl".

ADVANTAGES OF THE INVENTION

The electrophotographic transfer paper in the present invention had superior high-speed, throughput performance despite low basis weight and a low coating weight, and had good high-speed copy machine and printer properties and, especially, when it contains a water resistant additive in the coating layer, then it would also have good ink adhesion property and surface strength during offset printing.

BEST MODE FOR CARRYING OUT THE INVENTION

In this invention, the adhesive agent used in the coating layer of the coated paper must contain branched poly(meth)acrylamide copolymer with cationic groups and/or anion groups and having a weight average molecular weight of 50,000 to 1,000,000. The branched poly(meth)acrylamide copolymer is manufactured via the copolymerisation of (meth)acrylamide monomers, cationic monomers and/or an anionic monomers, and a cross-linking agents.

Acrylamide and methacrylamide are the most preferable (meth)acrylamide monomers to use as the raw material for the branched poly(meth)acrylamide copolymer. Other examples include N-ethyl acrylamide, N,N-dimethylacrylamide, N-isopropyl acrylamide and diacetone acrylamide etc., and water soluble N-substituted lower alkylacrylamides and other such substances. In the present invention, it is permissible to use just one type of (meth)acrylamide monomer, or to use two or more together.

The cationic monomers used in the copolymerization with (meth)acrylamide are cationic monomers with polymerizable double-bonds. These include, for example, tertiary amine monomers such as N,N-dimethylaminoethyl(meth)acrylate, N,N-diethylaminoethyl(meth)acrylate, N,N-dimethylaminopropyl (meth)acrylate, N,N-diethylaminopropyl (meth)acrylate, N,N-dimethylaminopropyl(meth)acrylamide, N,N-diethylaminopropyl(meth)acrylamide, allylamine, diallylamine etc. and salts thereof with inorganic acid such as hydrochloric acid and sulfuric acid, or organic acid such as acetic acid. Other examples include quaternary ammonium salt monomers which have been quaternized in a reaction between the aforementioned tertiary amine monomers and methyl chloride, benzyl chloride, dimethyl sulfuric acid, or epichlorohydrin, and the like. In this invention, it is possible to use one type of these cationic monomers, or two or more in combination.

Examples of anionic monomers used in the copolymerization with (meth)acrylamide are monomers with polymerizable double-bonds and a carboxyl group. These include monocarboxylic acids such as acrylic acid, methacrylic acid, crotonic acid; dicarboxylic acids such as maleic acid, fumaric acid, itaconic acid, citraconic acid, muconic acid etc. In this invention, it is possible to use one type of these anionic monomers or two or more in combination.

In this invention, it may be permissible to use the aforementioned cationic monomers and anionic monomers together, or to use just cationic monomers or just anionic monomers. The preferable compounding ratio for the anionic monomers and/or the cationic monomers is 0.01 to 15 parts by weight with respect to 100 parts by weight of (meth) acrylamide monomer.

In this invention, it is permissible to include non-ionic monomers as a copolymerization component in the branched poly(meth)acrylamide copolymer. The following non-ionic monomers can be used as appropriate: alkyl esters of the aforementioned anionic monomers (alkyl group of $C_1$-$C_8$), acrylonitrile, styrene, vinyl acetate and methyl vinyl ether etc., and their derivatives. In this invention, it is possible to use one type of these monomers, or two or more in combination.

In this invention, a cross-linkable monomer is used to make the poly(meth)acrylamide cross-linked. Examples of cross-linkable monomers include: ethylene glycol di(meth)acrylate, diethylene glycol di(meth)acrylate, triethylene glycol di(meth)acrylate and other di(meth)acrylates. Other examples include methylene bis(meth)acrylamide, ethylene bis(meth)acrylamide, hexamethylene bis(meth)acrylamide, and other bis(meth)acrylamides. Further examples are divinyl adipate, vinyl sebacate and other vinyl esters, allyl methacrylate, diallyl amine, diallyl dimethyl ammonium, diallyl phthalate and other di-functional vinyl monomers, 1,3,5-triacryloyl hexahydro-S-triazine, triallyl isocyanurate and other tri-functional vinyl monomers. In this invention, it is possible to use one type of these cross-linkable monomers, or two or more in combination.

As described above, by making the branched poly(meth) acrylamide copolymer cross-linked, it is possible to give the coated paper in this invention sufficient stiffness in spite of its low basis weight. However, with an increase in the degree of cross-linking comes a spinnability which is not preferable since it leads to boiling during the coating process and the occurrence of a mist between the coating rollers which give rise to non-uniform coating and other problems concerning coating process or product quality. On the other hand, it is conceivable that lowering the degree of cross-linking might produce an almost linear molecular structure thus reducing spinnability. This would necessitate that the proportion of cross-linking agent be adjusted during the reaction.

The branched poly(meth)acrylamide copolymer used in this invention is manufactured by the co-polymerization reaction of an aforementioned (meth)acrylamide monomer, cationic monomer and/or an anionic monomer, and a cross-linking agent using a method in the public domain. A weight average molecular weight of 50,000 to 1,000,000 is required with a preferable value between 100,000 and 800,000. Weight average molecular weights less than 50,000 are not able to give the coated paper sufficient stiffness. Further, not only there is no improvement in effect with weight average molecular weights in excess of 1,000,000, there is no practical benefit since polymerization becomes difficult.

In the present invention, it is necessary to adjust the viscosity of the branched poly(meth)acrylamide copolymer in order to facilitate coating. A Brookfield viscosity value of between 20 and 150 mPa·s is permissible for an aqueous solution with 10% branched poly(meth)acrylamide copolymer while a value of between 30 and 100 mPa·s is preferable.

Further, 1.0 to 10.0 parts by weight of branched poly(meth) acrylamide copolymer with respect to 100 parts by weight of pigment is preferable, while 2.0 to 8.0 parts by weight is even better. A proportion of less than 1.0 parts by weight makes it difficult to confirm an improvement in stiffness, while more than 10.0 parts by weight makes it more likely that coating stability problems, such as an increase of viscosity of coating color, will arise.

In the present invention, the aforementioned branched poly (meth)acrylamide copolymer shall be combined with an ordinal adhesive agent for conventional coated paper, to make the adhesive agent for the present coating layer. Examples of ordinary coated paper adhesive agents described above include: various copolymers such as styrene-butadiene copolymers, styrene-acrylic copolymers, ethylene-vinyl acetate copolymers, butadiene-methylmethacrylate copolymers, and vinyl acetate-butylacrylate copolymers etc. Also included are: synthetic resin adhesives such as polyvinyl alcohol-maleic anhydride copolymers and acrylic acid-methacrylate copolymers etc.; and proteins such as casein, soybean protein, synthetic protein and other. More examples include oxidized starch, positive starch, urea-phosphate esterified starch, hydroxyethyl etherified starch and other etherified starch, dextrin and other starches, carboxyethylcellulose, hydroxyethylcellulose, hydroxymethylcellulose and other cellulose derivatives. In the present invention, it is possible to select as appropriate at least one of these adhesives for use.

An amount for the coated paper adhesive agent of between 5 and 50 parts by weight with respect to 100 parts by weight of pigment is preferable, while 5 to 25 parts by weight is even better. Further, for the proportion (A:B) of branched poly (meth)acrylamide copolymer (A) to ordinal adhesive agent for conventional coated paper (B), 5:95 to 50:50 is preferable, with 10:90 to 40:60 particularly preferable. In particular, when using styrene-butadiene copolymer latex as the ordinal adhesive agent for conventional coated paper (B), 5 to 9 parts by weight as dry solid content of styrene-butadiene copolymer latex to 100 parts by weight of pigment is preferable in terms of ink adhesion property improvement. When using starch, 3 to 7 parts by weight of starch is preferable in terms of improving stiffness.

In the present invention, pigments that have been used conventionally can be used on their own, or two or more can be used together. Examples of pigments used in the coating layer include: kaolin, clay, delaminated clay, ground calcium carbonate, precipitated calcium carbonate, talc, titanium dioxide, barium sulphate, calcium sulfate, zinc oxide, silicic acid, silicate, colloidal silica, satin white and other inorganic pigments, and plastic pigments etc. In the present invention, printability and ink adhesion property are further improved by having kaolin account for at least 50 parts by weight of the 100 parts by weight of pigments when the kaolin has at least 65% of the particle size distribution in a standard range of 0.4 to 4.2 μm by volume.

Further, the particle size defined in this invention is measured by laser diffraction method. Values of particle size in volume standard are obtained by using the laser diffraction particle size dispersion instrument produced by Malvern Instruments Co.

In this invention, it is possible to use, as appropriate, auxiliary agents such as dispersants, thickener, water retention agents, antifoaming agents, colouring agent, and printability improvers etc. which are used in an ordinary coating fluid for coated paper.

In the present invention, it is preferable to use the printability improver as the auxiliary agent in the coating layer in order to give the paper: surface strength which is necessary for offset printing; an adhesion property which evaluates a situation of ink adhesion; water resistance to the dampening solution (piling); and blister resistance which is needed during the ink drying process in rotary offset printing.

Examples of printability improvers that can ordinarily be used include: polyamide polyurea resins, modified polyamide polyurea resins, special polyamide polyurea resins, special cationic resins, modified polyamine resins and other cationic printability improvers. Of these, it is preferable to use the water soluble modified polyamine resins. Using the highly cationic water soluble modified polyamine resins are even better.

In terms of the proportion of printability improver, 0.1 to 1.0 parts by weight for 100 parts by weight of pigment is preferable while 0.2 to 0.6 parts by weight is even better. Less than 0.1 parts by weight makes piling suppression effect insufficient while greater than 1.0 parts by weight gives rise to the problem of deleterious affect in the stiffness improvement effect.

Further, in the present invention, it is preferable for the coating layer to contain 0.1 to 1.0 parts by weight of conductive material for 100 parts by weight of pigment in order to improve the electrical properties of the paper surface. The following conductive materials can be given as examples of those used in the present invention: sodium chloride, potassium chloride, calcium chloride, magnesium chloride, sodium carbonate, sodium hydrogen carbonate, sodium sulfate, sodium aluminate, disodium phosphate and other inorganic salts, potassium formate, sodium bromate and other organic salts, soap, phosphate, carboxylate and other surfactants, quaternary ammonium salts, polyacrylate, styrene maleic acid and other high polymer electrolytes. However, it is preferable to use sodium chloride, sodium carbonate, sodium hydrogen carbonate and other inorganic salts.

An adhesive agent containing the branched poly(meth)acrylamide copolymer, a pigment and, as necessary, a conductive material, and auxiliary agents described above are dispersed into water to form a coating fluid. In the present invention, it is preferable to adjust the concentration of dry solid content in the coating fluid to 45% to 70% in weight from the viewpoint of image quality and coating performance.

In the present invention it is possible to use ordinary paper including acidic and neutral woodfree paper, medium quality paper and recycled paper as the base paper. It is preferable for the base paper to be 30 to 200 g/m$^2$ basis weight, with 40 to 80 g/m$^2$ particularly preferable. There are no particular restrictions for the pulp used in the base paper. For example it is possible to use the following on their own or in a mixture: chemical pulps such as LBKP (Laubholz Bleached Kraft Pulp), NBKP (Nadelholz Bleached Kraft Pulp), LBSP (Laubholz Bleached Sulfite Pulp), NBSP (Nadelholz Bleached Sulfite Pulp) etc., or mechanical pulps such as GP (groundwood pulp), TMP (thermomechanical pulp) or CTMP (chemi-thermomechanical pulp) etc., and recycled pulp.

In the present invention, it is preferable to include at least 10% mechanical pulp in weight of all the pulp in order to improve throughput and other performance. Since mechanical pulp has more rigid fibers than chemical pulp, base paper with mechanical pulp rarely crushes by the various pressures being subjected during the paper making processes. Accordingly, since using mechanical pulp adds bulk to the whole, the number of air pores within the base paper increases, then the opacity is improved and stiffness is simultaneously increased. Of the mechanical pulps, since groundwood pulp makes a large contribution to making the paper low density, in the present invention, it can be used preferably. Further, the preferable ratio of mechanical pulp is 60% or less of the total pulp in weight, with 40% or less particularly preferable from the viewpoint of whiteness, coating performance etc.

In the present invention, it is possible to use on their own or in a mixture the following fillers in the manufacture of base paper: ground calcium carbonate, precipitated calcium carbonate, chalk and other calcium carbonates, kaolin, clay, calcined clay, amorphous silicate, a precipitated calcium carbonate-silica compound, pyrophyllite, sericite, talc and other silicic acids, and titanium dioxides and other inorganic fillers. It is preferable to use a precipitated calcium carbonate-silica complex, wherein the surface of amorphous silicate or precipitated calcium carbonate is covered with silica, in order to improve image quality and running performance. The amorphous silicates may be any insoluble silicate. Examples include aluminium silicate hydrate, sodium aluminium silicate hydrate, calcium silicate hydrate, and magnesium silicate hydrate, among others. It is preferable that 2 to 20 percent filler is included in the total weight of the base paper, with 3 to 15 percent by weight even better.

In the present invention, it is possible to use a rosin sizing agent, synthetic sizing agent, petroleum resin sizing agent, neutral sizing agent and other sizing agents as additive sizing agents in the manufacture of base paper. Further, it is preferable to use aluminium sulfate, cationized starch or other fixing agent for textile in combination with an appropriate sizing agent.

In addition, depending upon the purpose, it is also possible to add as appropriate auxiliary additives to the paper making process such as paper strength additives, dyes, pH controlling agents, antifoaming agents, and pitch controlling agents.

There are no particular restrictions in a method to make the present paper. Acidic, neutral or alkaline paper making method using a Fourdrinier machine or a twin wire paper making machine is permissible. In terms of the fiber orientation angle α and the fiber orientation index η of paper, −15<α<15 and η<2 are preferable. Further, the fiber orientation angle α and the fiber orientation index η referred to here are values measured using the MOA-2001A molecular orientation instrument manufactured by the Oji Paper Co., Ltd. By setting as described above, pre- and post-printing curl characteristics can be improved, and good continuous paper throughput and high-speed running performance can be obtained when using high-speed copy machines and printers.

The aforementioned fiber orientation angle and the fiber orientation index can be controlled by adjusting the machine's J/W ratio (the ratio of the paper slurry spray velocity and the machine wire part speed), adjusting the paper making processing speed, adjusting the open degree of the slice lip, adjusting the collision angle of the paper stuff to the wire, and the like.

A coating layer is prepared by coating the aforementioned coating fluid on the base paper obtained as described above. In the present invention, it is possible to coat using the following coaters in the public domain: two-roll size press coater, gate roll coater, blade metaling size press coater, rod metaling size press coater, sym sizer and other film transfer roll coaters. Other coaters include: flooded nip/blade coaters, jet fountain/blade coaters, short dwell time application coaters, rod metaling coaters using grooved rods and blade rods instead of blades, curtain coaters and dye coaters.

In the present invention, one or two coating layers may be prepared on one or both sides of the base paper. The preferable coating quantity of the coating layer is 2 to 20 g/m$^2$ per one side from the viewpoints of recording properties and manufacturing workability while 2 to 15 g/m$^2$ is even better. Further, in the present invention, the benefit of good paper throughput performance and ink adhesion property is obtained even if the coating quantity is 3-8/m$^2$ per one side.

It is possible to use various dryers for the coating layer drying process on their own or in combination. These include: hot air dryers, heated cylinders, gas heater dryers, electric heater dryers, infrared heater dryers, and the like. Since the drying process influences the paper curl, in the present invention, it is preferable to use an apparatus which can control the dry balance between the top side and under side.

In the present invention, it is possible to add a calendaring process for the paper, which has been coated in the way described above, in order to enhance its smoothness. In terms of the calendaring process, it is permissible to use a super calendar, gloss calendar, soft calendar, or the like, which are normally used in the coated paper smoothing process. It is also permissible to use a combination of these. It is particularly preferable to conducting soft calendar processing from the viewpoint of improving the balance between the image quality and running performance. Further, it is preferable to have the processing temperature of the metal roller during the calendaring process at 100° C. or more with 150 to 250° C. even better. This makes it less likely that the Clark stiffness of the electrophotographic transfer paper will be adversely affected, therefore, not only running performance but also image quality are improved. It is preferable that the linear pressure during the calendaring process is 10 to 200 kg/cm with 10-100 kg/cm even better.

By making the CD direction Clark stiffness 30 cm$^3$/100 or more, the electrophotographic transfer paper in the present invention is improved in the paper throughput performance, especially, in the paper throughput performance and image quality in high-speed copy machines and printers. In particular, when recording on sheet paper of A4 or another size, it is preferable to set the CD direction Clark stiffness to 35 to 80 cm$^3$/100 so that the paper can demonstrate superiority of running performance, and the like, in high-speed copy machines and printers despite its lower basis weight.

The colour image quality and running performance for coated electrophotographic paper in the present invention is improved when the basis weight is between 40 g/m$^2$ and 200 g/m$^2$. In particular, the special effect of the present invention, that both colour image quality and high-speed running performance is sufficient, can be obtained despite the low basis weight as 40 to 100 g/m$^2$, especially, 50 to 75 g/m$^2$.

The following examples explain the present invention in further detail. However, the present invention is not restricted by these examples. Further, the parts by weight and weight % reflect the parts by weight as dry solid content and the weight % as dry solid content. Further, the experiments were carried out under the following evaluation methods on the physical properties of the coating materials and the performance of the coated paper obtained.

(1) Weight Average Molecular Weight of Polyacrylamide

GPC measurements were carried out using TSK-GEL P6000PW and P3000PW columns (both manufactured by the Tosoh Corporation) and 0.3M of sodium chloride aqueous solution as the solvent.

(2) Basis Weight

Measurements were taken in accordance with JIS P 8124.

(3) Clark Stiffness

Measurements were taken in accordance with JIS P 8143.

(4) Continuous Paper Throughput (Running) Performance

A Color Docutech 60 manufactured by FujiXerox Co., was used to print at a throughput speed of 60 sheets per minute (A4 lateral feed). Paper was cut into A4 size so that the long side direction coincides with the fiber direction. In order to print both sides of 1000 sheets, the paper was continuously fed and the number of jams was evaluated. The JEITA standard pattern J12/Ver. 1 was printed as the pattern.

(5) Measurements of the Colour Images Density

A Color Docutech 60 manufactured by FujiXerox Co., was used to print at a throughput speed of 60 sheets per minute (A4 lateral feed) and then the density of each of the solid image areas for black, cyan, magenta and yellow was measured using the Macbeth RD-191 densitometer manufactured by Gretag Co.

(6) Post Recording Gloss

The GM26D gloss meter manufactured by Murakami Shikisai Co., Ltd was used to measure the 75 degree gloss of the image areas.

(7) Ink Adhesion Property

An offset rotary press (Toshiba Offset Rotary Press: 0A-4B2T-600) was used to print the chart proposed by Society of Electrophotography of Japan at a printing speed of 700 rpm in four colours (in the order of black, cyan, magenta and yellow) and a visual inspection was made on the ink adhesion property of a sample after the printing of 10,000 units.

⊚: Extremely good

○: Good

Δ: Slightly poor but acceptable

X: Poor (8) Blanket Piling Suppression

An offset rotary press (Toshiba Offset Rotary Press: 0A-4B2T-600) was used to print in four colours (in the order of black, cyan, magenta and yellow) at a printing speed of 700 rpm and a visual inspection about degree of paper particle piling on black blanket was made after the printing of 10,000 units.

⊚: No evidence of paper particles

○: Hardly any evidence of paper particles

Δ: Some evidence of paper particles

X: A large quantity of paper particles had formed piles

The physical properties of polyacrylamide (PAM) specimens are shown in Table 1.

TABLE 1

| Name | Type | Ionicity | Ion Content (meq/g) | Molecular Weight |
|---|---|---|---|---|
| PAM-01 | Branched | Amphoteric | Cations: 0.68 Anions: 1.87 | 700,000 |
| PAM-02 | Branched | Amphoteric | Cations: 0.52 Anions: 1.49 | 300,000 |
| PAM-03 | Branched | Anionic | 1.95 | 300,000 |
| PAM-04 | Branched | Cationic | 0.75 | 200,000 |
| PAM-05 | Branched | Anionic | 1.81 | 150,000 |
| ST-481H (Seiko PMC Corporation) | Linear | Anionic | 1.66 | 300,000 |
| Polystron 851 (Arakawa Chemical Industries, Ltd | Branched | Amphoteric | Cations: 1.50 Anions: 2.14 | 3,000,000 |

Example 1

Base Paper Manufacture

The composition of the pulp used to make the base paper was 30 weight % of NBKP, 40 weight % of LBKP and 30 weight % of SGP. In terms of filler, 4 weight % of hydrated sodium aluminosilicate and 6 weight % of talc were included with respect to the paper weight. In addition, 0.2 weight % of rosin sizing agent was added as a sizing agent while 1.0 weight % of aluminium sulfate was added as a stabilizer. A twin wire paper maker was used to make the base paper with a basis weight of 58 g/m$^2$.

Coating Fluid Preparation

The pigment used was made from 70 parts by weight of kaolin (Capim DG: Produced by Imerys Co.: 68.4% content of particles where the particle size distribution by volume is between 0.4 to 4.2 μm) and 30 parts by weight of coarse ground calcium carbonate (FMT-75: Produced by Fimatec Co.: 69.5% content of particles where the particle size distribution by volume is between 0.4 to 4.2 μm). This pigment was added to water containing 0.2 parts by weight of sodium polyacrylate as a dispersant then dispersed in a Cellier mixer to produce a pigment slurry with a dry solid content concentration of 70 weight %. To this pigment slurry was added: 8.0 parts by weight of non-thickening type styrene-butadiene copolymer latex (glass transition temperature of 15° C. and gel quantity of 75 weight %); 2.0 parts by weight of hydroxyethyl etherified starch (PG295: Produced by Penford Co.); 4.0 parts by weight of polyacrylamide (PAM-01); 0.3 parts by weight of printability improver (PA6650: Produced by Seiko PMC Co.); and 0.8 parts by weight of sodium chloride. Water was then added to make a coating fluid with a concentration of 60 weight %.

Coating Paper Preparation

Each side of the aforementioned base paper was coated with the aforementioned coating fluid at a coating speed of 800 m/minute using a blade coater so that the coating quantity was 7 g/m$^2$ per one side of the paper. The paper was passed through a SCAF dryer then it was dried in a cylinder dryer so as to achieve a paper moisture content of 5.5%.

Calendaring

Next, soft nip calendaring was carried out under the following conditions: roll equivalent diameter of 400 mm; metal roll temperature of 160° C.; elastic roll Shore hardness of 85; paper throughput speed of 650 m/minute; linear pressure of 40 kg/cm; and the number of calendar nips is two. This process produced the coated transfer paper for the electrophotography of this invention.

Example 2

The coated paper was made in the same way as in Example 1 except that the amounts of the hydroxyethyl etherified starch (PG295: Produced by Penford Co.) and PAM-01 used in the coating fluid in Example 1 were changed to 4.0 parts by weight and 2.0 parts by weight, respectively.

Example 3

With the exception of changing the PAM-01 which was used in the coating fluid of Example 1 to PAM-02, the coated paper was made in the same way as in Example 1.

Example 4

With the exception of changing the PAM-01 which was used in the coating fluid of Example 1 to PAM-03, the coated paper was made in the same way as in Example 1.

Example 5

With the exception of changing the PAM-01 which was used in the coating fluid of Example 1 to PAM-04, the coated paper was made in the same way as in Example 1.

Example 6

With the exception of changing the PAM-01 which was used in the coating fluid of Example 1 to PAM-05, the coated paper was made in the same way as in Example 1.

Example 7

With the exception that the printability improver was not added to the coating fluid of Example 1, the coated paper was made in the same way as in Example 1.

Comparison Example 1

In this example, the polyacrylamide (PAM-1) and printability improver (PA6650) used in Example 1 were not used at all. Further, the quantity of hydroxyethyl starch (PG295) was changed from 2.0 parts by weight to 6.0 parts by weight. Other than these changes, the coated paper was made in the same way as in Example 1.

Comparison Example 2

In this example, the polyacrylamide (PAM-1) and printability improver (PA6650) used in Example 1 were not used at all. Instead 4.0 parts by weight of ST-481 was used. Other than these changes, the coated paper was made in the same way as in Example 1.

Comparison Example 3

In this example, the polyacrylamide (PAM-1) and printability improver (PA6650) used in Example 1 were not used at all. Instead 2.0 parts by weight of Polystron 851 was used. Further, the quantity of hydroxyethyl starch (PG295) was changed from 2.0 parts by weight to 4.0 parts by weight. Other than these changes, the coated paper was made in the same way as in Example 1.

However, the viscosity of the resultant coating fluid was at least 4000 mPa·s (Brookfield viscosity value at 20° C.) and hence lacked coating performance.

Comparison Example 4

Electrophotographic paper specified for the Color Docutech 60 and sold by Fuji Xerox Co. (brand name: C2) was used to carry out the same experiments.

Results from experiments using the coated paper acquired via the Examples and Comparison Examples are shown in Table 2.

TABLE 2

| | | Example 1 | Example 2 | Example 3 | Example 4 | Example 5 | Example 6 |
|---|---|---|---|---|---|---|---|
| Basis weight | (g/m$^2$) | 72 | 72 | 72 | 72 | 72 | 72 |
| Coating quantity | (g/m$^2$) | 14 | 14 | 14 | 14 | 14 | 14 |
| Polyacrylamide | Type | PAM-01 | PAM-01 | PAM-02 | PAM-03 | PAM-04 | PAM-05 |
| | Parts by weight | 4.0 | 2.0 | 4.0 | 4.0 | 4.0 | 4.0 |
| Styrene-butadiene copolymer latex | Parts by weight | 8.0 | 8.0 | 8.0 | 8.0 | 8.0 | 8.0 |
| Starch | Parts by weight | 2.0 | 4.0 | 2.0 | 2.0 | 2.0 | 2.0 |
| Printability improver | Added | Yes | Yes | Yes | Yes | Yes | Yes |
| Clark stiffness (CD) | cm$^3$/100 | 37.0 | 36.2 | 36.9 | 38.1 | 37.4 | 36.5 |
| Continuous running performance | Nos. of jam | 0 | 0 | 0 | 0 | 0 | 0 |
| Colour print density | K | 2.04 | 2.04 | 2.04 | 2.01 | 2.04 | 2.03 |
| | C | 1.08 | 1.09 | 1.09 | 1.05 | 1.08 | 1.09 |
| | M | 2.01 | 1.97 | 2.02 | 2.01 | 2.01 | 2.01 |
| | Y | 1.70 | 1.77 | 1.77 | 1.71 | 1.76 | 1.75 |
| | Total | 6.83 | 6.87 | 6.92 | 6.78 | 6.89 | 6.88 |
| Colour print area gloss | K | 91.5 | 92.5 | 91.8 | 92.1 | 91.2 | 92.1 |
| | C | 58.7 | 57.7 | 56.5 | 56.5 | 56.9 | 57.3 |
| | M | 87.0 | 86.2 | 87.4 | 87.2 | 86.5 | 87.4 |
| | Y | 73.2 | 75.3 | 74.2 | 73.1 | 72.2 | 74.8 |
| Ink adhesion property | | ○ | ○ | ◎ | ◎ | ◎ | ◎ |
| Blanket piling suppression | | ◎ | ◎ | ◎ | ◎ | ○ | ○ |

| | | Example 7 | Comparison Example 1 | Comparison Example 2 | Comparison Example 3 | Comparison Example 4 |
|---|---|---|---|---|---|---|
| Basis weight | (g/m$^2$) | 72 | 72 | 72 | 72 | 69 |
| Coating quantity | (g/m$^2$) | 14 | 14 | 14 | — | — |
| Polyacrylamide | Type | PAM-01 | — | ST-481 | Polystron 851 | — |
| | Parts by weight | 4.0 | — | 4.0 | 2.0 | — |
| Styrene-butadiene copolymer latex | Parts by weight | 8.0 | 8.0 | 8.0 | 8.0 | — |
| Starch | Parts by weight | 2.0 | 6.0 | 2.0 | 4.0 | — |
| Printability improver | Added | No | No | No | No | — |
| Clark stiffness (CD) | cm$^3$/100 | 37.3 | 32.3 | 30.5 | Not suitable for coating | 43.4 |
| Continuous running performance | Nos. of jam | 0 | 5 | 10 | | 0 |
| Colour print density | K | 2.04 | 2.01 | 2.02 | | 1.80 |
| | C | 1.08 | 1.05 | 1.04 | | 1.36 |
| | M | 2.01 | 1.99 | 1.98 | | 1.43 |
| | Y | 1.70 | 1.72 | 1.75 | | 1.59 |
| | Total | 6.83 | 6.77 | 6.79 | | 6.18 |
| Colour print area gloss | K | 91.1 | 91.1 | 90.2 | | 68.6 |
| | C | 58.2 | 56.7 | 55.6 | | 42.1 |
| | M | 86.6 | 87.2 | 88.1 | | 48.8 |
| | Y | 72.7 | 74.2 | 73.1 | | 47.7 |
| Ink adhesion property | | Δ | ◎ | ◎ | | — |
| Blanket piling suppression | | ○ | ◎ | X | | — |

As can be understood from Table 2, the coated paper in the present invention was found to be high in both colour image density and colour image gloss. The image was sharp and running performance was also found to be good. Not only was it found to be superior as an electrophotographic transfer paper, it had good ink adhesion property and blanket piling suppression, and was also suitable for offset printing.

On the other hand, in Comparison Examples 1 and 2, continuous performance was found to be poor due to insufficient paper stiffness. Further, with Comparison Example 2, from the large quantify of paper particles produced during printing, blanket piling suppression was found to be inadequate and surface strength poor.

Further, while continuous running performance was good in Comparison Example 4, colour image density and image gloss were found to be poorer than in the present invention.

INDUSTRIAL APPLICABILITY

The electrophotographic transfer paper in the present invention has superior paper throughput performance, running performance and good full colour image performance making it suitable for high-speed printing using sheet-fed electrophotographic colour copy machines or colour printers. In addition, since it also has high ink adhesion property and surface strength, it can also be used as coated paper in offset printing. Accordingly, it has high utility in "on-demand" small lot printing—which handles manuals, self-published and other materials in the order of a few thousand units or less—when it is used together with electrophotographic and offset printing. Further, the electrophotographic transfer paper in the present invention is also effective as book leaves, which come to many pages, since it boasts the above features despite its low basis weight.

The invention claimed is:

1. An electrophotographic transfer paper where at least one side of a base paper has a coating layer with a pigment and an adhesive agent forming a coated paper,
wherein the adhesive agent contains
    (1) 1.0 to 10.0 parts by weight of branched poly(meth) acrylamide copolymer having a cationic group and/or an anionic group and has a weight average molecular weight of 50,000 to 1,000,000, with respect to 100 parts by weight of pigment,
    (2) 5 to 9 parts by weight of styrene-butadiene system copolymer latex as dry solid content to 100 parts by weight of pigment, and
    (3) 3 to 7 parts by weight of starch to 100 parts by weight of pigment, wherein the ratio of (the branched poly (meth)acrylamide copolymer):(the styrene-butadiene system copolymer+the starch) is between 5:95-50:50; and
wherein at least 50 parts by weight of pigment within 100 parts by weight of pigment is the kaolin, which has a particle distribution of that at least 65% thereof has the particle size of 0.4 to 4.2 μm by volume.

2. The electrophotographic paper as described in claim 1, wherein the branched poly(meth)acrylamide copolymer has a weight average molecular weight of 50,000 to 300,000.

3. The electrophotographic paper as described in claim 1, wherein the content of the branched poly(meth)acrylamide copolymer is between 2.0 to 8.0 parts by weight with respect to 100 parts by weight of pigment.

4. The electrophotographic paper as described in claim 1, wherein the branched poly(meth)acrylamide copolymer results from the copolymerization of:
    at least one (meth) acrylamide monomer;
    at least one monomer selected from the group consisting of monomers having a cationic group and/or an anionic group together with polymerizable double-bonds and quaternary ammonium salt monomers with polymerizable double-bonds; and
    a cross-linking agent.

5. The electrophotographic paper as described in claim 1, wherein the content of the branched poly(meth)acrylamide copolymer in the adhesive agent is between 5% and 50% by weight.

6. The electrophotographic paper as described in claim 1, wherein the adhesive agent further has 5 to 9 parts by weight of styrene-butadiene system copolymer latex as dry solid content to 100 parts by weight of pigment and 3 parts by weight of starch to 100 parts by weight of pigment.

7. The electrophotographic paper as described in claim 1, wherein 100 parts by weight of pigment includes about 68.4 parts by weight of kaolin which has at least 65% of the particle size distribution in a range of 0.4 to 4.2 μm by volume.

8. The electrophotographic paper as described in claim 1, which further contains, in the coating layer comprising the pigment and adhesive agent, 0.1 to 1.0 parts by weight of printability improver to 100 parts by weight of pigment.

9. The electrophotographic paper as described in claim 1, wherein the CD direction Clark stiffness of the electrographic paper is at least 30 cm$^3$/100.

10. The electrophotographic paper as described in claim 1, wherein the basis weight of the electrographic transfer paper is between 40 and 100 kg/m$^2$.

11. The electrophotographic paper as described in claim 1, wherein the content of the branched poly(meth)acrylamide copolymer is between 2.0 to 8.0 parts by weight with respect to 100 parts by weight of pigment.

12. The electrophotographic paper as described in claim 1, wherein the pigment is kaolin, clay, delaminated clay, ground calcium carbonate, precipitated calcium carbonate, talc, titanium dioxide, barium sulphate, calcium sulfate, zinc oxide, silicic acid, silicate, colloidal silica, or satin white or a mixture thereof.

* * * * *